(12) United States Patent
Adrian

(10) Patent No.: US 10,860,428 B2
(45) Date of Patent: Dec. 8, 2020

(54) APPARATUS, SYSTEM, AND METHOD FOR INCREASING THE LONGEVITY OF ARCHIVAL TAPE

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 458 days.

(21) Appl. No.: 15/853,812

(22) Filed: Dec. 24, 2017

(65) Prior Publication Data
US 2019/0196915 A1  Jun. 27, 2019

(51) Int. Cl.
*G06F 16/00* (2019.01)
*G06F 11/14* (2006.01)
*G06F 3/06* (2006.01)

(52) U.S. Cl.
CPC ........ *G06F 11/1456* (2013.01); *G06F 3/0686* (2013.01)

(58) Field of Classification Search
CPC .. G06F 3/0686; G06F 11/1456; G06F 3/0659; G06F 11/1461; G06F 3/0616
See application file for complete search history.

(56) References Cited

U.S. PATENT DOCUMENTS

| | | | | |
|---|---|---|---|---|
| 5,581,458 A | * | 12/1996 | Richmond | G06F 3/0601 700/12 |
| 5,852,534 A | * | 12/1998 | Ozue | G11B 15/005 360/69 |
| 2019/0286346 A1 | * | 9/2019 | Freitag | G06F 3/0619 |

OTHER PUBLICATIONS

Gregory Chambers and H. Scott Matthews, "Use versus Manufacture Life Cycle Energy and Environmental Impacts for Tape Drives", IEEE, 2000, pp. 11-14. (Year: 2000).*

* cited by examiner

*Primary Examiner* — Cheryl Lewis
(74) *Attorney, Agent, or Firm* — FisherBroyles, LLP

(57) ABSTRACT

A computer-implemented method for increasing the longevity of archival tape may include suspending, by a scheduling computing system, an initiation of a read/write process for an archival tape. The method may also include reading a tape status stored on a status tag embedded on a cartridge of the archival tape. In addition, the method may include deducing, by the scheduling computing system, a health status of the archival tape from the tape status. Furthermore, the method may include adjusting, by the scheduling computing system, a read/write policy of the archival tape based on the health status. Finally, the method may include completing the read/write process of the archival tape based on the adjusted read/write policy. Various other methods, systems, and computer-readable media are also disclosed.

19 Claims, 7 Drawing Sheets

APPARATUS, SYSTEM, AND METHOD FOR INCREASING THE LONGEVITY OF ARCHIVAL TAPE

BACKGROUND

Tape media, such as magnetic tape, are the most commonly used form of archival storage for digital data. These types of media are generally packaged in cartridges or cassettes that can be stored in data centers and retrieved to read or write data in tape drives. Over time, archival tape can begin to degrade or lose the integrity of the stored data. Tape cartridges may need to be constantly tested to ensure integrity, and degrading archival tape may need to be replaced. For example, a data center may routinely read a single wrap of a tape cartridge to check for errors, and data may be copied to a new tape cartridge to prevent potential loss.

However, spooling and unspooling archival tape may be time consuming and occupies a tape drive that may be required for other purposes, such as writing new data to archival tape. For a data center with a large number of archival-tape units, there may be a limited amount of time and hard drives available to perform such checks. In addition, tape cartridges may be physically moved to a new data center, and a new verification process may be required to ensure the quality of the tape cartridges. The simple act of inserting a tape cartridge into a tape drive may also contribute to the deterioration of the tape. Furthermore, archival tape may need to be compacted to reduce space left by deleted data, and compaction may take up two tape drives simultaneously while also being a lengthy process. Various processes such as these may all contribute to tape degradation as well as to the cost of maintaining multiple tape drives. Thus, better methods to manage archival tape are needed to ensure better longevity and decreased tape degradation.

SUMMARY

As will be described in greater detail below, the instant disclosure describes various apparatuses, systems, and methods for increasing the longevity of archival tape by storing and managing a tape status on an embedded status tag to reduce unnecessary read/write processes. In one example, a method for increasing the longevity of archival tape may include suspending, by a scheduling computing system, an initiation of a read/write process for an archival tape. The method may also include reading a tape status stored on a status tag embedded on a cartridge of the archival tape. In addition, the method may include deducing, by the scheduling computing system, a health status of the archival tape from the tape status. Furthermore, the method may include adjusting, by the scheduling computing system, a read/write policy of the archival tape based on the health status. Finally, the method may include completing the read/write process of the archival tape based on the adjusted read/write policy.

In one embodiment, the read/write process may include reading data from the archival tape, writing data to the archival tape, spooling the archival tape, and/or unspooling the archival tape. Additionally or alternatively, the read/write process may include reading a wrap of the archival tape, performing a full verification of the archival tape, performing a compaction process from the archival tape to a new archival tape, and/or performing a background scan of the archival tape.

In some examples, the tape status may include a time of a last full verification of the archival tape, a time of a last wrap read of the archival tape, and/or a percent of a last known media error rate of the archival tape. In these examples, deducing the health status of the archival tape may include determining a data integrity of the archival tape based on the tape status, predicting tape deterioration based on the time of the last wrap read, and/or estimating a durability score of data on the archival tape based on the time of the last wrap read and the last known media error rate.

In some embodiments, adjusting the read/write policy may include rescheduling the read/write process, changing a frequency of the read/write process, revising the read/write process, canceling the read/write process, and/or adjusting a different read/write process. In these embodiments, the above method may further include updating the tape status stored on the status tag of the archival tape based on the completed read/write process.

In one example, the above method may further include alerting an administrator of a failure of the archival tape. Additionally or alternatively, the above method may further include improving a predictive analysis method used to predict a future health status of the archival tape.

According to various embodiments, an archival-tape unit may include an archival tape that is configured to store archival data. The archival-tape unit may also include a cartridge dimensioned to house the archival tape. Furthermore, the archival-tape unit may include a status tag, embedded on the cartridge, that is configured to store status data about the archival tape that facilitates procedures by a scheduling computing system to deduce a health status of the archival tape from a tape status, adjust a read/write policy of the archival tape based on the health status, and command completion of a read/write process of the archival tape based on the adjusted read/write policy.

In one example, the archival tape may include a magnetic tape medium capable of storing digital data for sequential access.

In one embodiment, the cartridge may include one or more reels dimensioned to fit a width of the archival tape for wrapping and an enclosure dimensioned to encompass the reel and the wrapped archival tape such that a portion of the archival tape is exposed for read/write processes.

In some examples, the status tag may be embedded on the cartridge such that a status-tag reader, within a proximity of the cartridge, is capable of reading the tape status stored on the status tag for use by the scheduling computing system. Additionally or alternatively, the status tag may be embedded on the cartridge such that a status-tag writer, within a proximity of the cartridge, is capable of updating the tape status stored on the status tag.

In addition, a corresponding tape-archival system for increasing the longevity of archival tape may include one or more archival-tape units that include an archival tape configured to store archival data, a cartridge dimensioned to house the archival tape, and a status tag, embedded on the cartridge, that is configured to store status data about the archival tape. The tape-archival system may also include one or more status-tag readers that read a tape status stored on a status tag embedded on the archival-tape unit. Additionally, the tape-archival system may include a scheduling computing system that suspends an initiation of a read/write process for the archival tape, deduces a health status of the archival tape from the tape status, adjusts a read/write policy of the archival tape based on the health status, and commands completion of the read/write process of the archival tape based on the adjusted read/write policy.

In one embodiment, the scheduling computing system may be electronically coupled to the status-tag reader such that the scheduling computing system commands the status-tag reader to read the status tag embedded on the archival-tape unit. Additionally, the scheduling computing system may be electronically coupled to the status-tag reader such that the scheduling computing system receives a tape status of the archival tape from the status-tag reader.

In some examples, the archival-tape unit may be stored in a vertical storage stack, dimensioned to store a plurality of archival tapes in a plurality of horizontal slots, such that a face of the vertical storage stack exposes the status tag embedded on the archival-tape unit to the status-tag reader. In these examples, the scheduling computing system may command completion of the read/write process of the archival tape by commanding one or more tape-handling apparatuses to relocate one or more archival-tape units from a slot of the vertical storage stack to a tape drive or from the tape drive to the slot of the vertical storage stack. Additionally or alternatively, the scheduling computing system may command completion of the read/write process of the archival tape by commanding the tape drive to complete the read/write process of the archival tape.

In the above examples, the tape-handling apparatus may include a robotic arm dimensioned to hold the archival-tape unit, extract the archival-tape unit from the vertical storage stack, extract the archival-tape unit from the tape drive, insert the archival-tape unit into the vertical storage stack, and insert the archival-tape unit into the tape drive. Furthermore, the scheduling computing system may be electronically coupled to the tape drive such that the scheduling computing system sends commands to the tape drive and/or receives data from the tape drive.

Additionally, in the above examples, the tape drive may be dimensioned to hold the archival-tape unit. The tape drive may also be dimensioned to complete the read/write process by facilitating reading data from the archival tape, writing data to the archival tape, spooling the archival tape, unspooling the archival tape, reading a wrap of the archival tape, performing a full verification of the archival tape, performing a compaction process from the archival tape to a new archival tape held by another tape drive, and/or performing a background scan of the archival tape.

In some embodiments, the scheduling computing system may be electronically coupled to a status-tag writer such that the scheduling computing system commands the status-tag writer to update the tape status stored on the status tag of the archival tape based on the completed read/write process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
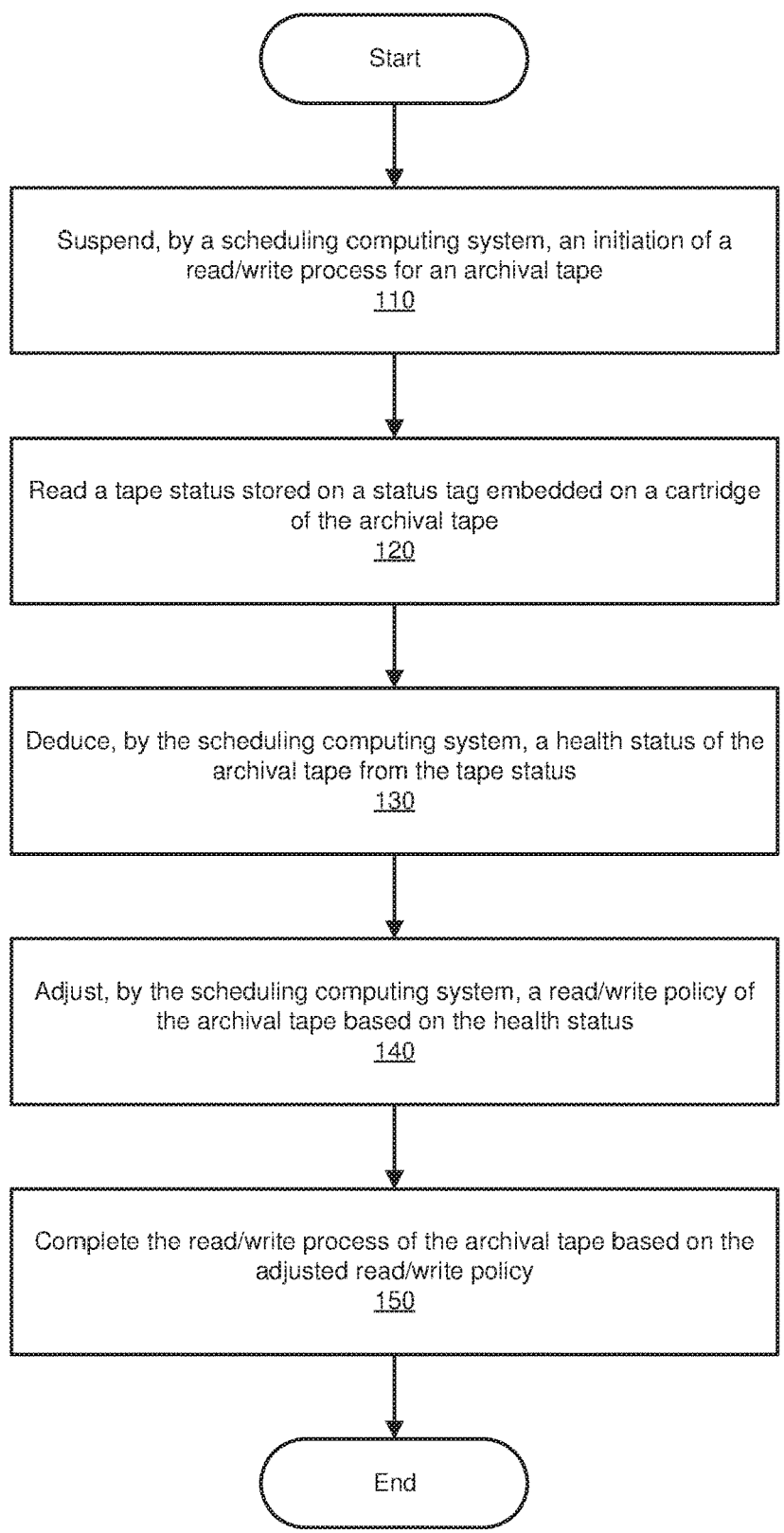
FIG. 1 is a flow diagram of an exemplary method for increasing the longevity of archival tape.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for increasing the longevity of archival tape. As will be explained in greater detail below, embodiments of the instant disclosure may, by storing a status of an archival tape on a tag embedded in the tape cartridge, track the deterioration rate of the archival tape to manage read/write processes. The disclosed embodiments may thus enable tape statuses to follow physical tape cartridges when archival tape is relocated to avoid the need for redundant tape verification. By adjusting read/write processes based on a tape status, the disclosed embodiments may better schedule these processes to reduce the amount of wear and tear on archival tape. As an example, the disclosed embodiments may delay a compaction process for a tape cartridge with a low media error rate that indicates the data on the tape is largely intact. This may, in turn, slow the rate of degradation of the tape media while also reducing the amount of time that a tape drive is occupied.

In addition, the embodiments described herein may improve the functioning of a computing device by predicting archival tape lifespan and deterioration in order to better schedule various functions performed on the archival tape by devices such as tape drives. These embodiments may also improve the fields of archival data storage and media management by minimizing the use of tape drives and decreasing unnecessary processes. Thus, the disclosed embodiments may improve archival media management and reduce tape degradation.

Figure 2:
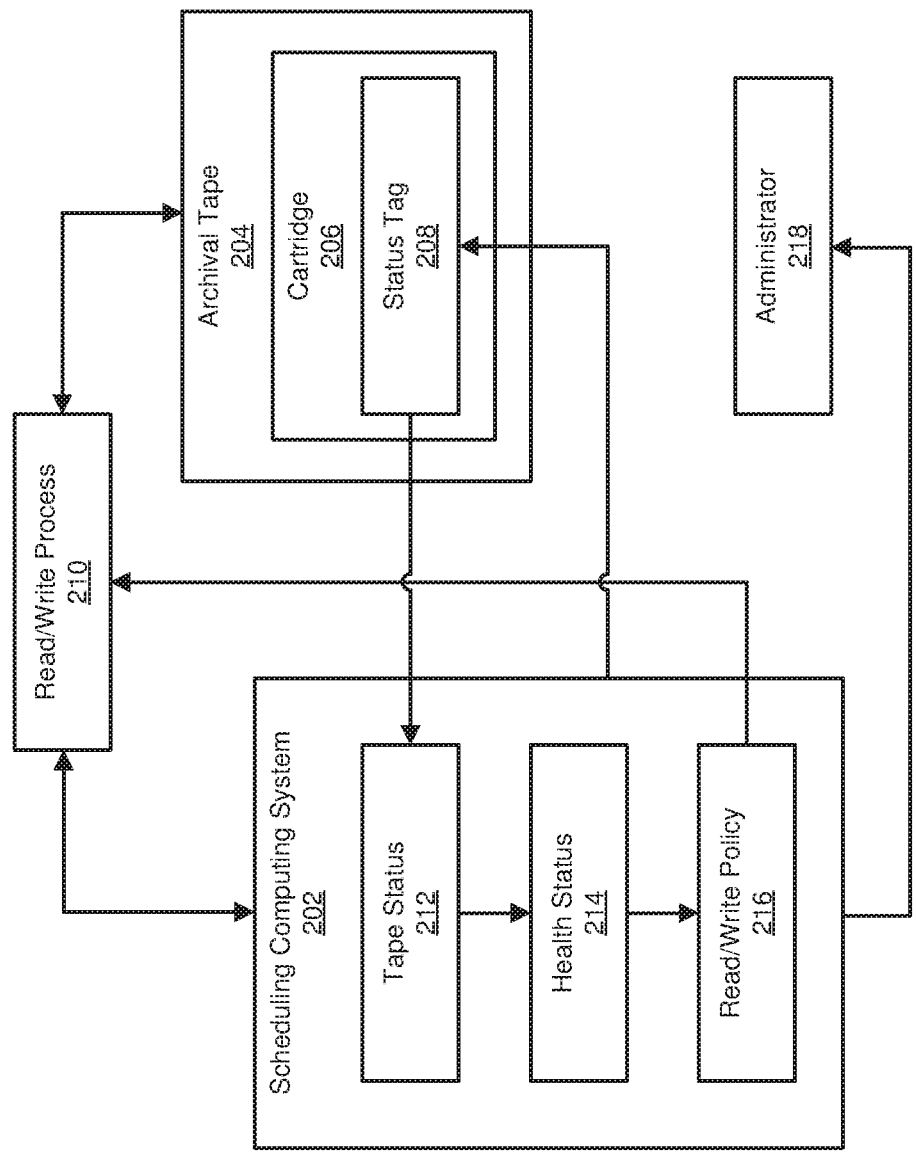
FIG. 2 is a block diagram of an exemplary scheduling computing system for increasing the longevity of archival tape.
Figure 3:
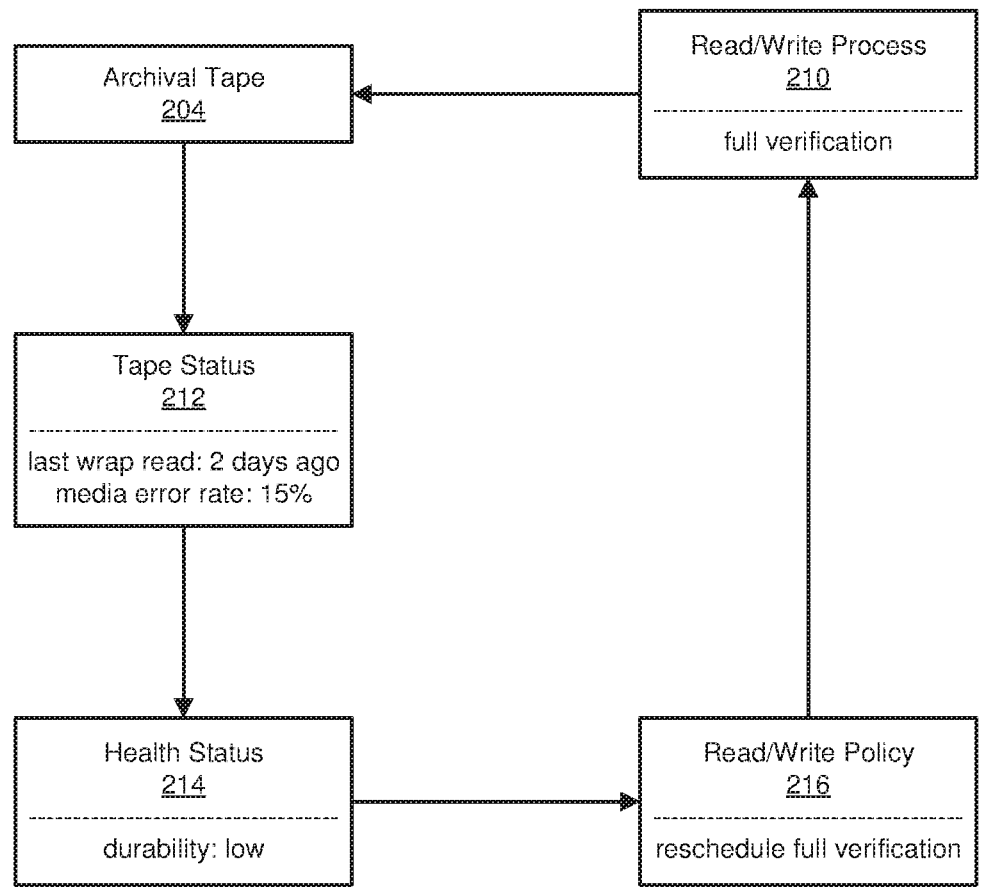
FIG. 3 is a block diagram of an exemplary deduction of an archival tape health status.

The following will provide, with reference to FIGS. 1-3, detailed descriptions of computer-implemented methods for increasing the longevity of archival tape using a scheduling computing system. In addition, the discussion associated with FIGS. 4-5 will provide examples of archival-tape units. The discussion associated with FIG. 6 will provide examples of tape-archival systems and vertical storage stacks. Furthermore, detailed descriptions of an exemplary relocation of an archival-tape unit will be provided in connection with FIG. 7.

FIG. 1 is a flow diagram of an exemplary computer-implemented method 100 for increasing the longevity of archival tape. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may suspend, by a scheduling computing system, an initiation of a read/write process for an archival tape. For example, FIG. 2 is a block diagram of an exemplary scheduling computing system 202 for increasing the longevity of archival tape. As illustrated in FIG. 2, a scheduling computing system 202 may suspend an initiation of a read/write process 210 for an archival tape 204.

Scheduling computing system 202 generally represents any type or form of computing system or computing component that is capable of reading computer-executable instructions. For example, scheduling computing system 202 may represent a central computing device that manages processes run by a data center. Additional examples of scheduling computing system 202 include, without limitation, security systems, application servers, web systems, storage systems, and/or database systems configured to run certain software applications and/or provide various security, web, storage, and/or database services, variations or combinations of one or more of the same, and/or any other suitable computing system. Although illustrated as a single entity in FIG. 2, scheduling computing system 202 may include and/or represent a plurality of computing devices or systems that work and/or operate in conjunction with one another.

Figure 4:
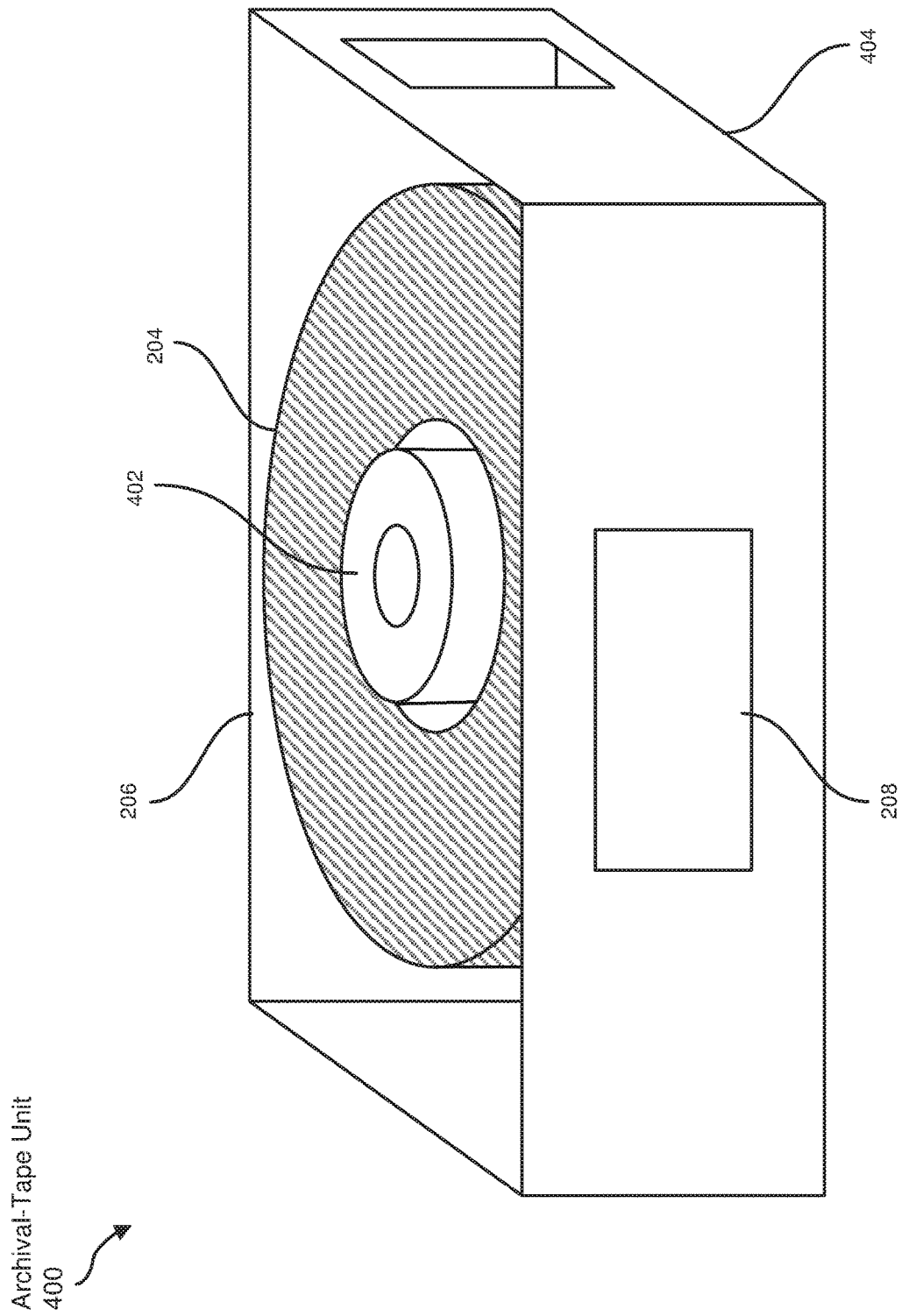
FIG. 4 is a perspective view of the inside of an exemplary archival-tape unit.

In some embodiments, archival tape 204 may be configured to store archival data as part of an archival-tape unit, such as archival-tape unit 400 of FIG. 4. In these embodiments, archival tape 204 may include a magnetic tape medium capable of storing digital data for sequential access. Alternatively, archival tape 204 may represent any other suitable medium for storing digital data for long-term archival purposes.

The systems described herein may perform step 110 of FIG. 1 in a variety of ways. For example, read/write process 210 of FIG. 2 may include reading data from archival tape 204, writing data to archival tape 204, spooling archival tape 204, and/or unspooling archival tape 204. Read/write process 210 of FIG. 2 may also include reading a wrap of archival tape 204, performing a full verification of archival tape 204, performing a compaction process from archival tape 204 to a new archival tape, and/or performing a background scan of archival tape 204.

As used herein, the term "wrap" refers to a single, end-to-end pass through an archival tape. Reading a single wrap of archival tape 204 may include completely spooling and unspooling archival tape 204, which may indicate whether archival tape 204 remains intact. In contrast, performing a full verification of archival tape 204 may include reading all wraps of archival tape 204 to test all data written to archival tape 204.

The term "compaction," as used herein, generally refers to a process of transferring existing data on one archival tape to a second archival tape to reduce the amount of storage space occupied by deleted data. Because archival tape may only be written once, deleted data may not be overwritten with new data. Thus, compaction may reduce the total amount of archival tape used in a data center. For example, two archival-tape units with over half of their archival tapes deleted may be compacted to a single new archival-tape unit by reading the data on the two old units and writing it to the new unit.

Returning to FIG. 1, at step 120, one or more of the systems described herein may read a tape status stored on a status tag embedded on a cartridge of the archival tape. For example, scheduling computing system 202 in FIG. 2 may instruct a status-tag reader to read a tape status 212 stored on a status tag 208 embedded on a cartridge 206 of archival tape 204.

The systems described herein may perform step 120 in a variety of ways. In some examples, tape status 212 may include a time of a last full verification of archival tape 204, a time of a last wrap read of archival tape 204, and/or a percent of a last known media error rate of archival tape 204. Additionally, tape status 212 may include other information about read/write processes, such as the last read/write process performed on archival tape 204 or the position of the last wrap read. In one example, the time of the last full verification of archival tape 204 may indicate the initial process of writing data to archival tape 204, where the data may be verified, or a verification performed during a background scan of archival tape 204. Furthermore, the time of the last wrap read of archival tape 204 may coincide with the time of the last full verification, due to the process of verification requiring a read of all wraps of archival tape 204. Similarly, a compaction process may provide the time of the last wrap read of archival tape 204.

Figure 5:
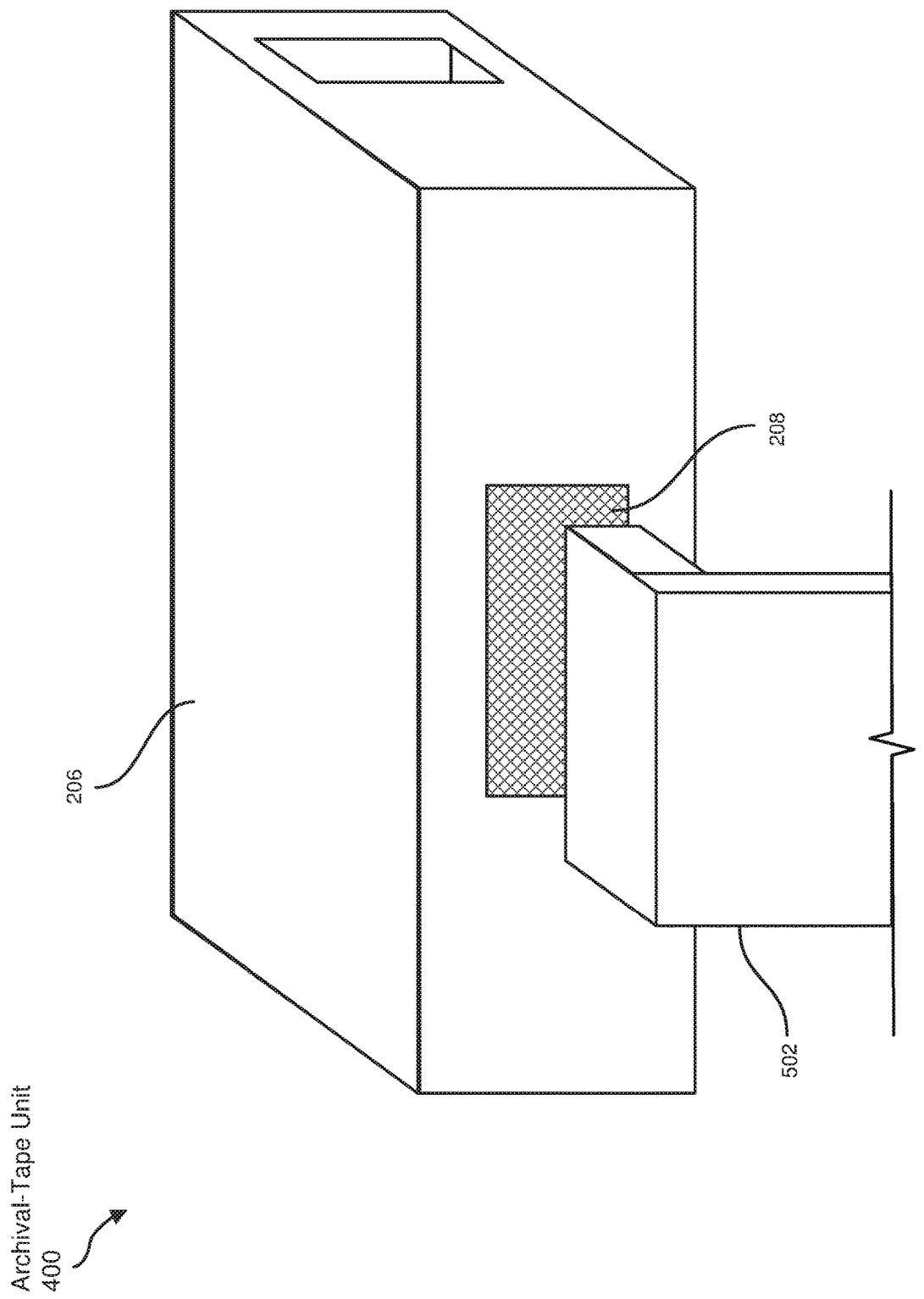
FIG. 5 is a perspective view of the outside of an exemplary archival-tape unit and a status-tag reader or writer.

As illustrated in FIG. 4, an archival-tape unit 400 may include cartridge 206, which may be dimensioned to house archival tape 204. Status tag 208 may then be embedded on cartridge 206 and configured to store status data about archival tape 204 that facilitates procedures by scheduling computing system 202 to perform method 100 to increase the longevity of archival tape. For example, status tag 208 may represent a radio-frequency identification (RFID) chip physically attached to the side of a linear tape-open (LTO) cartridge. As illustrated in FIG. 5, status tag 208 may be embedded on cartridge 206 such that a status-tag reader/writer 502, within a proximity of cartridge 206, is capable of reading tape status 212 stored on status tag 208 for use by scheduling computing system 202.

Additionally, cartridge 206 may include one or more reels dimensioned to fit a width of archival tape 204 for wrapping and an enclosure dimensioned to encompass the reel and wrapped archival tape 204 such that a portion of archival tape 204 is exposed for read/write processes. In the example of FIG. 4, cartridge 206 may include a reel 402 and an enclosure 404 that includes a window on one side to enable reading and/or writing of archival tape 204.

Figure 6:
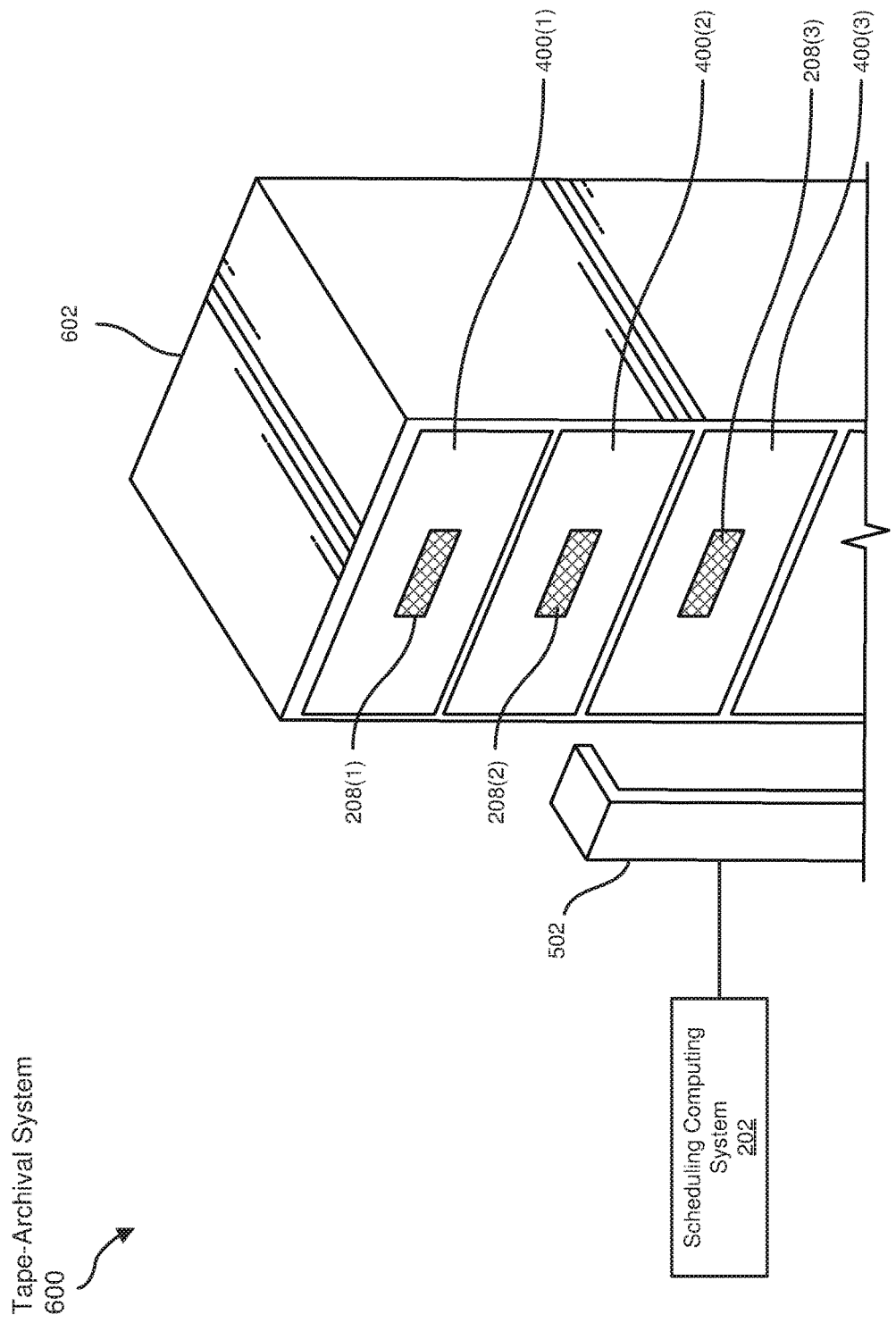
FIG. 6 is a perspective view of an exemplary vertical storage stack of an exemplary tape-archival system.

In one embodiment, archival-tape unit 400 may function as part of a larger tape-archival system, such as a data center. As illustrated in FIG. 6, a tape-archival system 600 may include multiple archival-tape units 400(1)-(3). Tape-archival system 600 may also include one or more status-tag readers, such as status-tag reader/writer 502, that read tape statuses stored on status tags 208(1)-(3) embedded on archival-tape units 400(1)-(3). Tape-archival system 600 may additionally include scheduling computing system 202 to perform the methods described herein. In this embodiment, scheduling computing system 202 may be electronically coupled to status-tag reader/writer 502 such that scheduling computing system 202 commands status-tag reader/writer 502 to read status tag 208(1), status tag 208(2), and/or status tag 208(3) and receives tape status 212 from status-tag reader/writer 502.

In the example of FIG. 6, archival-tape units 400(1)-(3) may be stored in a vertical storage stack 602, dimensioned to store a plurality of archival tapes in a plurality of horizontal slots, such that a face of vertical storage stack 602 exposes status tags 208(1)-(3) embedded on archival-tape units 400(1)-(3) to status-tag reader/writer 502. In this example, archival-tape units 400(1)-(3) may be stored in vertical stacks to prevent skew and/or potential sagging in the center of archival tapes over time.

Returning to FIG. 1, at step 130, one or more of the systems described herein may deduce, by the scheduling computing system, a health status of the archival tape from the tape status. For example, scheduling computing system 202 in FIG. 2 may deduce a health status 214 of archival tape 204 from tape status 212.

The systems described herein may perform step 130 in a variety of ways. In some embodiments, scheduling computing system 202 may deduce health status 214 by determining a data integrity of archival tape 204 based on tape status 212, predicting tape deterioration based on the time of the last wrap read, and/or estimating a durability score of data on archival tape 204 based on the time of the last wrap read and the last known media error rate.

As illustrated in FIG. 3, scheduling computing system 202 may first suspend read/write process 210 to perform a full verification on archival tape 204 and read tape status 212. Scheduling computing system 202 may then estimate, based on tape status 212 of the time of the last wrap read of archival tape 204 (e.g., "2 days ago") and the last known media error rate (e.g., 15%), that the durability of archival tape 204 is low due to increasingly high error. As another example, by determining that a wrap of archival tape 204 has recently been read, scheduling computing system 202 may calculate the amount of data to correct based on the error rate of data read from the wrap and determine that the data integrity of archival tape 204 is high.

Returning to FIG. 1, at step 140, one or more of the systems described herein may adjust, by the scheduling computing system, a read/write policy of the archival tape based on the health status. For example, scheduling computing system 202 in FIG. 2 may adjust a read/write policy 216 of archival tape 204 based on health status 214.

The systems described herein may perform step 140 in a variety of ways. In one embodiment, scheduling computing system 202 may adjust read/write policy 216 by rescheduling read/write process 210, changing a frequency of read/write process 210, revising read/write process 210, canceling read/write process 210, and/or adjusting a different read/write process. For example, scheduling computing system 202 may change how read/write process 210 is performed based on how read/write process 210 will affect archival tape 204. In another example, scheduling computing system 202 may alter a compaction process to begin compaction from a last wrap read and avoid reading all wraps of archival tape 204.

In the example of FIG. 3, scheduling computing system 202 may adjust read/write policy 216 to reschedule the full verification of read/write process 210 to a later date after determining that the durability of archival tape 204 is low and may be adversely affected by the verification process. Conversely, scheduling computing system 202 may determine that a full verification may be necessary to test the health of an alternate archival tape that has not been recently read and has a previously low media error rate indicating high durability.

Returning to FIG. 1, at step 150, one or more of the systems described herein may complete the read/write process of the archival tape based on the adjusted read/write policy. For example, scheduling computing system 202 in FIG. 2 may instruct a tape drive to complete read/write process 210 on archival tape 204 based on adjusted read/write policy 216.

The systems described herein may perform step 150 in a variety of ways. In some examples, scheduling computing system 202 may command completion of read/write process 210 by commanding one or more tape-handling apparatuses to relocate one or more archival-tape units from a slot of vertical storage stack 602 of FIG. 6 to a tape drive or from the tape drive to the slot of vertical storage stack 602. Additionally or alternatively, scheduling computing system 202 may command the tape drive to complete read/write process 210 of archival tape 204.

Figure 7:
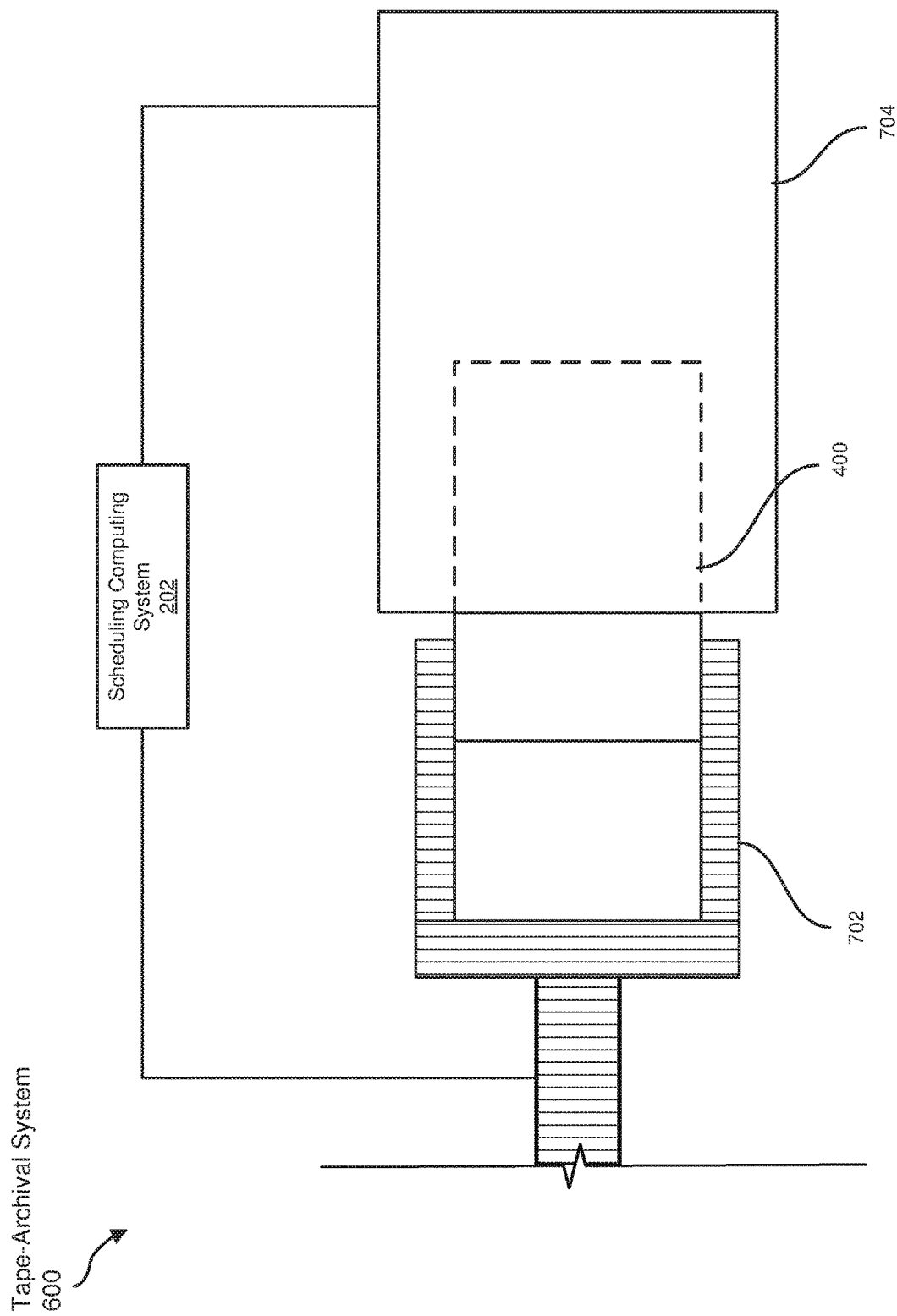
FIG. 7 is a side view of an exemplary relocation of an exemplary archival-tape unit.

As illustrated in FIG. 7, a tape-handling apparatus 702 may include a robotic arm dimensioned to hold archival-tape unit 400, extract archival-tape unit 400 from vertical storage stack 602 of FIG. 6, extract archival-tape unit 400 from a tape drive 704, insert archival-tape unit 400 into vertical storage stack 602, and insert archival-tape unit 400 into tape drive 704. In this example, scheduling computing system 202 may be electronically coupled to tape drive 704 such that scheduling computing system 202 sends commands to tape drive 704 and/or receives data from tape drive 704. Furthermore, tape-handling apparatus 702 may include additional components to facilitate inserting or removing archival-tape unit 400, such as a protruding part to select an ejection button on tape drive 704.

In the embodiment of FIG. 7, tape drive 704 may be dimensioned to hold archival-tape unit 400 and complete read/write process 210 of FIG. 2 by facilitating reading data from archival tape 204, writing data to archival tape 204, spooling archival tape 204, unspooling archival tape 204, reading a wrap of archival tape 204, performing a full verification of archival tape 204, performing a compaction process from archival tape 204 to a new archival tape held by another tape drive, and/or performing a background scan of archival tape 204. In this embodiment, scheduling computing system 202 may also be electronically coupled to the other tape drive or to a separate computing system that is electronically coupled to the other tape drive.

In further embodiments, as shown in FIG. 2, the systems described herein may update tape status 212 stored on status tag 208 of archival tape 204 based on completed read/write process 210. For example, after completing the rescheduled full verification of FIG. 3, scheduling computing system 202 may command a status-tag writer to update tape status 212 with a time of the full verification and adjust the time of the last wrap read to the current time.

As illustrated in FIG. 5, status-tag reader/writer 502 may alternatively represent a status-tag writer or a combination status-tag reader/writer. In this example, status tag 208 may be embedded on cartridge 206 such that a status-tag reader/writer 502, within a proximity of cartridge 206, is capable of updating tape status 212 stored on status tag 208. Furthermore, as shown in FIG. 6, scheduling computing system 202 may be electronically coupled to status-tag reader/writer 502 such that scheduling computing system 202 commands status-tag reader/writer 502 to update tape statuses stored on status tags 208(1)-(3) based on completed read/write processes. In some examples, status-tag reader/writer 502 may update status tag 208 while archival-tape unit 400 is held by tape drive 704 immediately after tape drive 704 performs read/write process 210.

In one embodiment, the systems described herein may further alert an administrator of a failure of archival tape 204. For example, as shown in FIG. 2, scheduling computing system 202 may alert an administrator 218 of a failure of archival tape 204 after determining that health status 214 indicates archival tape 204 is highly vulnerable to failure or has already failed. In this example, scheduling computing system 202 may halt all read/write processes for archival tape 204 and wait for archival tape 204 to be replaced before continuing normal functions.

In additional embodiments, the systems described herein may further improve a predictive analysis method used to predict a future health status of archival tape 204. For example, scheduling computing system 202 may use machine learning methods to predict a lifespan of archival tape 204 based on the known lifespans of similar archival-tape units and read/write processes similar to read/write process 210 performed on these similar archival-tape units. As used herein, the terms "predictive analysis" and "machine learning" generally refer to data analysis methods or computational algorithms that may learn from known data to make future predictions. The systems described herein may improve the predictive analysis method by updating known data on archival tape health statuses with health status 214 and completed read/write process 210. In these embodiments, the systems described herein may store data about archival tapes, read/write processes, tape statuses, or other relevant information used in predicting archival tape health.

In another example, scheduling computing system 202 may use the improved predictive analysis method to improve a future deduction of health status 214 of archival tape 204 during an analysis of tape status 212. In this example, the improved predictive analysis method may more accurately deduce health status 214, which may better inform read/write policy 216 for archival tape 204. Thus, the predictive analysis method may be used to determine how various read/write processes can affect archival tape and to continuously improve how health status 214 may be deduced from tape status 212. In some examples, the predictive analysis method may also be used to predict archival tape health in other tape-archival systems or use data from the other tape-archival systems to predict the health of archival tape 204.

As discussed throughout the instant disclosure, the disclosed methods, systems, and apparatuses may provide one or more advantages over traditional methods of managing archival media. For example, the scheduling computing system described herein may analyze the status of archival-tape units to calculate and predict the health of the tape media. As another example, by storing current tape status such as the time of a last verification process or the last known error rate of an archival-tape unit on a status tag, the methods, systems, and apparatuses described herein may embed relevant information directly onto a tape cartridge so that the information persists when an archival tape is sent off-site. Furthermore, by adjusting the read/write policies to perform various functions on an archival tape, the disclosed methods, systems, and apparatuses may reduce unnecessary read/write processes that may reduce the lifespan of the archival tape. Thus, the methods, systems, and apparatuses described herein may improve predictions on when to perform various read/write functions, saving both time using tape drives and costs to replace drives or archival-tape units.

As detailed above, the computing devices and systems described and/or illustrated herein broadly represent any type or form of computing device or system capable of executing computer-readable instructions. In their most basic configuration, these computing system(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the computing instructions described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more computing instructions stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In addition, one or more of the systems described herein may transform data, physical devices, and/or representations of physical devices from one form to another. For example, one or more of the systems recited herein may receive a tape status to be transformed, transform the tape status, output a result of the transformation to a storage or output device, use the result of the transformation to predict a health of an archival tape, and store the result of the transformation in a server or database. Additionally or alternatively, one or more of the systems recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   suspending, by a scheduling computing system, an initiation of a read/write process for an archival tape;
   reading a tape status stored on a status tag embedded on a cartridge of the archival tape, wherein the status tag is embedded on the cartridge such that a status-tag reader, within a proximity of the cartridge, is capable of reading the tape status stored on the status tag for use by the scheduling computing system;
   deducing, by the scheduling computing system, a health status of the archival tape from the tape status;
   adjusting, by the scheduling computing system, a read/write policy of the archival tape based on the health status; and
   completing the read/write process of the archival tape based on the adjusted read/write policy.

2. The method of claim 1, wherein the read/write process comprises at least one of:
   reading data from the archival tape;
   writing data to the archival tape;
   spooling the archival tape;
   unspooling the archival tape;
   reading a wrap of the archival tape;
   performing a full verification of the archival tape;
   performing a compaction process from the archival tape to a new archival tape; or
   performing a background scan of the archival tape.

3. The method of claim 1, wherein the tape status comprises at least one of:
   a time of a last full verification of the archival tape;
   a time of a last wrap read of the archival tape; or
   a percent of a last known media error rate of the archival tape.

4. The method of claim 3, wherein deducing the health status of the archival tape comprises at least one of:
   determining a data integrity of the archival tape based on the tape status;
   predicting tape deterioration based on the time of the last wrap read; or
   estimating a durability score of data on the archival tape based on the time of the last wrap read and the last known media error rate.

5. The method of claim 1, wherein adjusting the read/write policy comprises at least one of:
   rescheduling the read/write process;
   changing a frequency of the read/write process;
   revising the read/write process;
   canceling the read/write process; or
   adjusting a different read/write process.

6. The method of claim 5, further comprising updating the tape status stored on the status tag of the archival tape based on the completed read/write process.

7. The method of claim 1, further comprising at least one of:
   alerting an administrator of a failure of the archival tape; or
   improving a predictive analysis method used to predict a future health status of the archival tape.

8. An archival-tape unit comprising:
   an archival tape that is configured to store archival data;
   a cartridge dimensioned to house the archival tape; and
   a status tag, embedded on the cartridge such that a status-tag reader, within a proximity of the cartridge, is capable of reading a tape status stored on the status tag, that is configured to store status data about the archival tape that facilitates procedures by a scheduling computing system to:
      deduce a health status of the archival tape from the tape status;
      adjust a read/write policy of the archival tape based on the health status; and
      command completion of a read/write process of the archival tape based on the adjusted read/write policy.

9. The archival-tape unit of claim 8, wherein the archival tape comprises a magnetic tape medium capable of storing digital data for sequential access.

10. The archival-tape unit of claim 8, wherein the cartridge comprises:
    at least one reel dimensioned to fit a width of the archival tape for wrapping; and
    an enclosure dimensioned to encompass the reel and the wrapped archival tape such that a portion of the archival tape is exposed for read/write processes.

11. The archival-tape unit of claim 8, wherein the status tag is embedded on the cartridge such that a status-tag writer, within a proximity of the cartridge, is capable of updating the tape status stored on the status tag.

12. A tape-archival system comprising:
    at least one archival-tape unit that comprises:
       an archival tape configured to store archival data;
       a cartridge dimensioned to house the archival tape; and
       a status tag, embedded on the cartridge such that a status-tag reader, within a proximity of the cartridge, is capable of reading a tape status stored on the status tag, that is configured to store status data about the archival tape;
    at least one status-tag reader that reads the tape status stored on the status tag embedded on the archival-tape unit; and
    a scheduling computing system that:
       suspends an initiation of a read/write process for the archival tape;
       deduces a health status of the archival tape from the tape status;
       adjusts a read/write policy of the archival tape based on the health status; and
       commands completion of the read/write process of the archival tape based on the adjusted read/write policy.

13. The tape-archival system of claim 12, wherein the scheduling computing system is electronically coupled to the status-tag reader such that the scheduling computing system:
    commands the status-tag reader to read the status tag embedded on the archival-tape unit; and
    receives a tape status of the archival tape from the status-tag reader.

14. The tape-archival system of claim 12, wherein the archival-tape unit is stored in a vertical storage stack, dimensioned to store a plurality of archival tapes in a plurality of horizontal slots, such that a face of the vertical storage stack exposes the status tag embedded on the archival-tape unit to the status-tag reader.

15. The tape-archival system of claim 14, wherein the scheduling computing system commands completion of the read/write process of the archival tape by at least one of:

commanding at least one tape-handling apparatus to relocate at least one archival-tape unit:
    from a slot of the vertical storage stack to a tape drive; or
    from the tape drive to the slot of the vertical storage stack; or
commanding the tape drive to complete the read/write process of the archival tape.

16. The tape-archival system of claim 15, wherein the tape-handling apparatus comprises a robotic arm dimensioned to:
    hold the archival-tape unit;
    extract the archival-tape unit from the vertical storage stack;
    extract the archival-tape unit from the tape drive;
    insert the archival-tape unit into the vertical storage stack; and
    insert the archival-tape unit into the tape drive.

17. The tape-archival system of claim 15, wherein the scheduling computing system is electronically coupled to the tape drive such that the scheduling computing system:
    sends commands to the tape drive; and/or
    receives data from the tape drive.

18. The tape-archival system of claim 15, wherein the tape drive is dimensioned to:
    hold the archival-tape unit; and
    complete the read/write process by facilitating at least one of:
        reading data from the archival tape;
        writing data to the archival tape;
        spooling the archival tape;
        unspooling the archival tape;
        reading a wrap of the archival tape;
        performing a full verification of the archival tape;
        performing a compaction process from the archival tape to a new archival tape held by another tape drive; or
        performing a background scan of the archival tape.

19. The tape-archival system of claim 12, wherein the scheduling computing system is electronically coupled to a status-tag writer such that the scheduling computing system commands the status-tag writer to update the tape status stored on the status tag of the archival tape based on the completed read/write process.

* * * * *